3,250,754
Patented May 10, 1966

3,250,754
CHEMICAL COMPOSITION CARBOXYL SUBSTITUTED POLYMETHYLENE POLYMERS AND PROCESSES FOR THEIR PREPARATION
Clare Augustus Stewart, Jr., Wilmington, Del., assignor to E. I. du Pont de Nemours and Company, Wilmington, Del., a corporation of Delaware
No Drawing. Filed Apr. 26, 1962, Ser. No. 190,269
8 Claims. (Cl. 260—80.5)

This invention is directed to a new composition of matter. In particular, the present invention is directed to novel modified polymethylene polymers having side-chain carboxyl substituted hydrocarbon and halohydrocarbon groups and, optionally, side-chain alkyl groups, the side-chains, if desired, bearing one or more halogen atoms. The invention also concerns processes for making and curing these novel polymers.

Polyhydrocarbon polymers, such as polyethylene and polypropylene, are of increasing commercial importance today. These polymethylenes and modified polymethylene polymers are finding a wide variety of uses in making molded solid articles, fibers, films, rigid and resilient foams, caulks, and coatings. Depending on the polymer composition these products can be elastomeric or "plastic."

It is, therefore, an object of the present invention to provide novel modified polymethylene polymers. It is another object to provide a process for the preparation of said novel polymers. It is an additional object to provide a process for the cure of said polymers.

These and other objects will become apparent in the following description and claims.

More specifically, the present invention is directed to a normally solid modified polymethylene polymer containing for each 100 chain carbon atoms (A) monocarboxyl substituted side-chain hydrocarbon groups having the structure —$CH_2$—$(R)_n$—$CO_2H$, where R is $C_1$–$C_{16}$ alkylene and halogen substituted $C_1$–$C_{16}$ alkylene, with the proviso that the alpha carbon to the carboxyl group shall be halogen-free, and $n$ is 0 to 1, and (B) side-chain $C_1$–$C_{16}$ alkyl groups or halogen substituted $C_1$–$C_{16}$ alkyl groups, where $A=0.01$ to 25, and $B=0.0$ to 49.99 with the proviso that the maximum value of $A+B$ is equal to 50.

The novel substituted polymethylene products of the present invention range in character from stiff plastics to soft elastomers.

The nature of the substituted polymethylene products of the present invention vary widely in character with the total number and kind of side chain substituents as do the uncarboxylated polymers from which they may be considered to be derived; their nature also varies with the degree of carboxylation. Thus, when the total amount of substitution is small ($A+B<8$), the products show polyethylene type crystallinity and are relatively "plastic" in nature. In these products, a very small proportion of carboxyl substituents ($A<0.1$) results in increased retention of dyes which can form salts with the carboxyl groups. Modification of the polymer to obtain superior heat-distortion resistance or altered extrudability becomes possible by means of salt-forming reactions. The modified polymethylenes having a higher degree of carboxyl-substitution display improved adhesion and greater permeability to water, and can likewise be modified in obvious ways by salt formation and ester formation reactions of the polymer.

Products which have a moderate proportion of side-chain alkyl (or halogen substituted alkyl) groups, a high proportion of a mixture of side-chain alkyl (or halogen-substituted alkyl) groups, or a high proportion of a single side chain alkyl (or halogen-substituted alkyl) group and are not highly "stereoregular" in arrangement are elastomeric in nature. With a low degree of carboxylation, these products have the desirable property that their viscosity, either as dry polymer or in solution, may be varied by appropriate selection of the amount and type of salt-forming reagents which may be added. With intermediate carboxyl contents, preferably 0.5 to 2.5 COOH groups/hundred chain carbons, salts of these products with divalent or polyvalent metals are desirable thermoplastic elastomers—that is, they behave at ordinary temperatures as a cured elastomer but can be reversibly shaped under pressure at high temperatures at which the ionic interactions in the polymer are more mobile. Many variations in the compounding of such an elastomer can be forseen by one skilled in the art and it is possible to alter greatly the ability of the polymer to resist or adapt to imposed forces by variation of the type or amount of the salt-forming metal or metals, and by addition of monovalent metal salts or oxides, competing acidic materials, plasticizers, fillers, etc. It is also possible to cure such elastomers irreversibly, as for example with peroxides, in addition to salt-forming and other reactions of the carboxyl groups in order to modify the physical and chemical properties of the polymer.

With still higher amounts of carboxyl groups ($A>2$), the novel products of this invention tend to become less elastomeric in nature due to the strong attractive forces between molecules and are more suitable for uses such as the preparation of adhesives, dispersing agents, resilient "plastics," thickeners and the like.

These side-chain carboxyl substituted polymethylene polymers can be prepared by ozonizing chain-saturated polyhydrocarbon or halohydrocarbon polymers containing side-chain carbon-carbon double bonds, and oxidizing the ozonide thereby formed.

The preferred polyhydrocarbon polymers for ozonolysis are the sulfur-vulcanizable unsaturated rubber-like interpolymers of at least one terminally unsaturated straight chain monoolefin containing from 2 to 18, preferably 2 to 8, carbon atoms, and an aliphatic open-chain structure

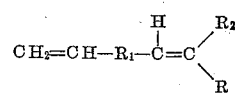

where $R_1$ is an alkylene radical and where one of $R_2$ or $R_3$ is alkyl, the other being H or alkyl, the diolefin comprising from about 1 to about 40 mole percent of the interpolymer, said interpolymers having an iodine number of from 3 to 50 and an intrinsic viscosity in benzene at 25° C. of from 0.5 to 5.0. Representative copolymers include: ethylene/1 - butene/1,4 - hexadiene; ethylene/propylene/1,4 - hexadiene; propylene/1 - hexene/6-methyl-1,5-heptadiene; and ethylene/1,4-hexadiene. Copolymers of this type and procedures for their preparation are more particularly described in U.S. Patent No. 2,933,480 (issued to Gresham and Hunt).

Representative halopolyhydrocarbon polymers for ozonolysis can be made by adding halogen or a hydrocarbon halide to part of the side-chain carbon-carbon double bonds of the previously described unsaturated hydrocarbon copolymers. The halogenation and hydrohalogenation procedures familiar to those skilled in the olefin art can be used. Representative procedures which are applicable are given in Synthetic Organic Chemistry, R. B. Wagner and H. C. Zook, John Wiley & Sons, Inc., New York, 1953, pages 106–108. It is not always necessary to isolate the hydrocarbon copolymer before adding the halogen. For example, after a copolymer has been made in solution and the catalyst deactivated with alcohol, one can add bromine at 0° C. in any proportion slightly less than required for complete saturation and thereafter isolate the copolymer by conventional means. The residual unsaturation provides sites for ozonolysis. Such copolymers can be substituted by bromine, chlorine, or iodine, or mixtures thereof.

The halopolyhydrocarbon polymers suitable for ozonolysis include the normally solid copolymers, containing at least 2% by weight of a side-chain substituted halogen, made by copolymerizing (1) ethylene; (2) at least one halogen-bearing olefin, said olefin having the structure $CH_2=CH-CH_2-Q$ where Q is a monovalent aliphatic hydrocarbon radical substituted by at least one halogen atom; (3) at least one open-chain non-conjugated hydrocarbon diene of the type described heretofore and, optionally, (4) at least one alpha-monoolefin $R-CH=CH_2$ where R is an alkyl radical having 1 to 16, preferably 1 to 8, carbon atoms. These copolymers can be prepared in methylene chloride using a coordination catalyst prepared by mixing vanadium tris(acetylacetonate) with diisobutyl aluminum monochloride, the molar ratio of aluminum to vanadium preferably being 9:1, the concentration of vanadium in the reaction mixture ranging from about 0.0005 to about 0.005 mole/liter; oxygen, water vapor, CO, carbon dioxide, and compounds bearing Zerewitinoff active hydrogen atoms being excluded; the temperature ranging between about $-10°$ C. to $+25°$ C. The halogen (X) containing monomers have the structures $CH_2=CH-CH_2(CH_2)_mX$ and

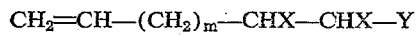

$$CH_2=CH-(CH_2)_m-CHX-CHX-Y$$

where $m=1-12$ and Y is a hydrocarbon group. Representative members include: 4-chloro-1-butene; 4-bromo-1-butene; 5-chloro-1-pentene; 5-bromo-1-pentene, which is one of the particularly preferred halogenated olefins; 6-fluoro-1-hexene; 7-bromo-1-heptene; 9-bromo-1-nonene; 11-chloro-1-hendecene; 11-bromo-1-hendecene; 11-iodo-1-hendecene; 13-bromo-1-tridecene; and 15-bromo-1-pentadecene. Other useful halogenated olefins include: 12-bromomethyl-1-tridecene; 4-chloro-1-pentene; 4-chloro-1-hexene; 5-chloro-1-hexene; 5-bromo-1-hexene; 5-iodo-1-hexene; 6-bromo-5-bromomethyl-1-heptene. Still other halogenated olefins include: 5,5,5-trichloro-1-pentene; 4,5-dibromo-1-hexene; 5,6-dibromo-1-hexene, another preferred compound; and 4,4,5,5-tetrabromo-1-hexene. The useful alpha olefins for preparing the copolymers of the fourth class include: propylene; 1-butene; 4-methyl-1-pentene; 1-pentene; 1-hexene; 1-heptene; 1-octene; 1-nonene; 1-decene; 5-methyl-1-nonene; 5,5-dimethyl-1-octene; 4-methyl-1-hexene; 4,4-dimethyl-1-pentene; 5-methyl-1-hexene; 4-methyl-1-heptene; 5-methyl-1-heptene; 6-methyl-1-heptene; 4,4-dimethyl-1-hexene; 5,6,6-trimethyl-1-heptene; 1-dodecene; 1-octadecene.

The ozonolysis is conducted in such a manner that all of the side-chain carbon-carbon double bonds of the polyhydrocarbon or halohydrocarbon polymers are converted to carboxyl groups. The ozonolysis is carried out in a solvent which is resistant to ozone; a preferred solvent is carbon tetrachloride. The ozone is supplied as pure ozone, or ozonized air, or ozonized oxygen. Conventional ozone generators such as the commercially available Wellsbach Ozonator T-3 can be employed; a representative stream contains 1% by weight ozone in air.

The reaction is most conveniently performed at 20-30° C. Higher temperatures lead to a lower concentration of dissolved ozone and extensive loss of solvent unless the reaction is performed under pressure. Some reduction in molecular weight occurs, also, especially at elevated temperature, but is not of importance in the preferred range. Lower temperatures are likewise applicable but generally offer no advantage sufficient to offset the refrigeration required. It is generally desirable to have present an acidic reagent bearing hydroxy groups to avoid the formation of polymeric-type ozonides which can cause the formation of insoluble gels. Accordingly, the solvent used generally contains 5-10 moles of methanol, acetic acid or other suitable reagent or mixtures thereof for every mole of unsaturation present in the polymer being ozonized. It is also generally desirable to minimize the concentration of unsaturated groups and intermediate oxidation products present in the solution at any time, since some of these can lead to undesirable cross-linking and other side reactions. This may be conveniently accomplished by dilution of the reaction mixture with solvent, the use of the large excess of ozone (e.g. 3-4 moles ozone for every carbon-carbon double bond), the addition of the unsaturated polymer to solution in which ozone is already present or a mixture of such methods which will be obvious to one skilled in the art. It is preferred to add a solution of the unsaturated polymer to the ozone saturated carbon tetrachloride solution while fresh ozone is supplied at a rate at least equal to its consumption by the polymer carbon-carbon double bonds.

The carboxyl groups formed in this manner are believed to arise from oxidation of intermediately-formed aldehydes or their derivatives. While these are largely oxidized in the course of ozonization, it is preferred to oxidize the solution further to minimize the amount of such groups which can lead to insolubilization and other undesirable effects. This is most conveniently performed by treatment of the ozonized solution with an organic peracid, e.g. peracetic acid, or other active-oxygen containing reagents, generally refluxing the solution for one to two hours at atmospheric pressure, at about 80° C. Correspondingly longer or shorter times at other temperatures may be employed if other solvents or pressures are used. One supplies about 2-3 gram-atoms of active oxygen for every carbon-carbon double bond originally present in the polymer. Other purification processes may be desirable if contaminants are present in the polymer which is to be ozonized depending on the intended use of the product. Thereafter, the polymer can be used in solution or it can be isolated by conventional means such as coagulation with non-solvent, evaporation of the solvent or drum drying. In a representative purification procedure, the polymer solution, after ozonolysis and oxidation, is cooled and extracted with water to remove alcohol, organic acid, and low molecular weight by-products, for example, the acetic acid split off during the ozonolysis of the carbon-carbon double bond of a side-chain group having the structure $-CH_2-CH=CH-CH_3$ (resulting from incorporation of 1,4-hexadiene monomer).

Other methods for ozonizing and oxidizing the polymer are applicable and in fact desirable for polymers which are sufficiently crystalline as to be insoluble under the conditions described above. It is possible, for example, to accomplish the same objectives by ozonization of thin films of unsaturated polymers, but if a minimum of side reactions are required, it will be preferred to have the polymer in solution which may be accomplished by an appropriate increase in temperature and/or choice of solvent.

Any of the polymethylenes can be made by the preceding method. The polymethylenes having a low carboxyl content, below about 0.35 carboxyl group per 100 chain carbon atoms, can also be made by copolymerizing at least one alpha monoolefin of the formula $CH_2=CH-Z$, where Z is hydrogen or $C_{1-16}$ alkyl, with a magnesium or zinc salt of a carboxyl alkyl substituted alpha monoolefin in the presence of a coordination catalyst at about 0-25° C. in hydrocarbon or halogenated hydrocarbon solvents, preferably tetrachloroethylene. After the copolymerization has been completed, the catalyst is deactivated with alcohol, the free carboxyl groups are obtained by addition of acid in excess of the number of salt groups, and the copolymer is precipitated by addition to a non-solvent such as acetone.

Representative examples of the alpha monoolefins include: ethylene; propylene; 1-butene; 1-pentene; 1-heptene; 1-octene; 1-decene; 5-methyl-1-hexene; 4-methyl-1-pentene; 5,6,6-trimethyl-1-heptene; and 1-dodecene; and 1-octadecene and mixtures thereof. Representative examples of the carboxylic acid salts include magnesium 10- henedecenoate, zinc 10-henedecenoate, other salts which may be used are, for example, zinc 7-octenoate, zinc 9-decenoate, magnesium 11-dodecenoate, and magnesium 2-methyl-11-dodecenoate. Salts of other metals and terminally unsaturated acids may also be used subject to the limitations that the salt show at least some solubility under the conditions selected for polymerization and show a minimum degree of poisoning to the catalyst selected. Representative copolymers useful for making the modified polymethylenes of the present invention include: ethylene/magnesium 10 - hendecenoate; ethylene/propylene/zinc 10-hendecenoate; ethylene/1-butene/zinc 9 - decenoate; and 1-octadecene/magnesium 2-methyl-11-dodecenoate.

The coordination catalyst is obtained by mixing a vanadium salt with an organo aluminum compound in an inert solvent. By the term "inert" is meant a solvent which does not interfere with the desired course of the reaction. Representative types of the vanadium salts are vanadium halides, oxyhalides, and alkoxides, the vanadium being at a valence state of at least 3. Vanadium tetrachloride, vanadium tris(acetylacetonate), and vanadium oxytrichloride (also called vanadyl chloride) are typical useful vanadium salts. The preferred organo aluminum compounds have the structure $R_3Al$ or $(R)_2AlX$ where R is $C_1$–$C_{16}$ alkyl (such as ethyl, isobutyl, octyl, or hexadecyl) and X is a chlorine atom or bromine atom. In particular, the aluminum trialkyls have the structure

wherein $X_1$, $X_2$, and $X_3$ may be the same or different alkyl radicals having up to about 18 carbon atoms. Representative examples of aluminum trialkyls include: triethyl aluminum; tri n-propyl aluminum; triisopropyl aluminum; triisobutyl aluminum, which is preferred; tri n-amyl aluminum; tri n-octyl aluminum; tri n-decyl aluminum; tri n-dodecyl aluminum; tri n-hexadecyl aluminum; diethyl propyl aluminum; diisobutyl hexyl aluminum; and diisoamyloctyl aluminum. The reaction product of 0.5 mole to 2.0 moles of aluminum chloride with 1.0 mole of said aluminum trialkyl is a satisfactory organo aluminum compound. Alkyl aluminum dihalides and dialkyl aluminum monohalides may also be employed. Representative examples of these types include: di-isobutyl aluminum monochloride; diethyl aluminum monochloride; isobutyl aluminum dichloride; isobutyl aluminum dibromide; ethyl aluminum dichloride; ethyl aluminum sesquichloride; isobutyl aluminum sesquichloride. Lithium aluminum tetraalkyls are also useful. Typical compounds of this type include: lithium aluminum tetradecyl and lithium aluminum tetrabutyl. Mixtures of these aluminum compounds or mixtures of the vanadium compounds can be employed when desired.

A preferred catalyst is made by mixing vanadium oxytrichloride and diisobutyl aluminum monochloride. Another preferred catalyst is made by mixing vanadium tris (acetylacetonate) and diisobutyl aluminum chloride. Mixtures of aluminum compounds and mixtures of vanadium compounds can be employed when desired. As is apparent to those skilled in the art, the selection of the preferred catalyst components will depend to a certain extent on the particular copolymer to be prepared. Representative examples of the vanadium catalyst are more particularly described in U.S. Patent No. 2,962,451.

In preparing the coordination catalysts either the aluminum compound or the vanadium compound is contacted with a mixture of the other in the inert solvent, frequently tetrachloroethylene; alternatively both compounds are introduced simultaneously into the solvent. On account of the instability of organic aluminum solutions in halogen hydrocarbon solvents, the organo aluminum compounds are sometimes supplied commercially for operating safety as hydrocarbon solutions. The catalyst can be formed before, during or after the introduction of the copolymerizable monomers. It is frequently preferable to premix the catalyst in the absence of monomers. Since there is a tendency for the metal salts to decrease the activity of the coordination catalyst during the polymerization, it is frequently desirable to add premixed catalyst continually or intermittently during the polymerization reaction. Alternatively, the organo aluminum compound and the vanadium compound can be added separately to the polymerization mixture to form additional catalyst in situ.

When making the heretofore described representative coordination catalyst, the proportions of the aluminum compound to the vanadium are selected so that the molar ratio of Al:V is at least 1.5:1. Those skilled in the art can determine the best proportion to use with a particular set of catalyst components. When the aluminum compound is made by reacting an aluminum trialkyl, such as triisobutyl aluminum, with aluminum chloride, the organo aluminum supplied should provide at least 3 alkyl groups for every atom of vanadium. When the value of the alkyl:vanadium ratio is below 3:1, the catalyst activity tends to be reduced. When vanadium tris(acetylacetonate) is employed, Al:V ratio values in the range 4:1 to 10:1 are sometimes preferred.

The copolymer preparation is carried out in a hydrocarbon or chlorinated hydrocarbon solvent. Tetrachloroethylene and cyclohexane are preferred. Methylene chloride, carbon tetrachloride, 1,-dichloroethane, and ethyl chloride are examples of other suitable media.

Those skilled in the art can determine the concentration of the aluminum and vanadium compounds which give the most convenient process and the copolymer product best suited for a particular purpose. It is generally desirable to use rather high concentrations. The vanadium concentration in the reaction mixture usually ranges from about 0.001 to 0.01 molar. It is possible to prepare concentrated mixtures which, when desired, can be diluted by addition of more inert solvent.

The catalyst used in the present invention can be made in the presence or absence of the copolymerizable monomers. In the former case, the representative vanadium and aluminum compounds can be simultaneously or sequentially added in a single portion or intermittently or continually to a mixture of part or all of the monomers in the reaction solvent. In general the catalyst stability decreases as the temperature is raised or as the concentration of the magnesium or zinc salt of the unsaturated carboxylic acid is increased.

When making the modified polymethylene compounds of the present invention the monomer mixture is contacted with the coordination catalyst in a selected halogenated hydrocarbon at atmospheric, superatmospheric, or subatmospheric pressure. In typical produces, the heretofore described vanadium and aluminum compounds are added to tetrachloroethylene and stirred for several minutes at 5° C. The carboxy monomer is introduced as the metal salt and stirred until at least partly dissolved. Thereafter, while agitation is continued, gaseous and/or liquid hydrocarbon monomer is added and copolymer is formed. The reaction temperature recommended is about 20 to 30° C. At temperatures above this the catalyst activity tends to be shorter lived; at temperatures above 50° C., interaction between halogenated hydrocarbons and the catalyst components becomes prominent enough to decrease the catalyst activity significantly. It is not only inconvenient to operate at temperatures such as 0° C., below, but there is a tendency for the magnesium or zinc salt to be insoluble and remain unreacted. In order to obtain the polymethylene compounds it is essential that all the monomers be at least partially in solution; as stated before, this is particularly true of the carboxylic acid monomer.

The reaction time is not critical, it may vary from about 10 minutes to an hour or more. There is a tendency for the polymerization to slow down as the catalyst is somewhat deactivated by the metal salt; the rate may be maintained fairly constant by intermittent or continuous addition of additional catalyst, preferably premixed. Representative reaction times at 25° C. include 20 and 60 minutes.

Any material which is inert to the reactants is suitable for the polymerization vessel. Glass, glass-enamel, or stainless steel are satisfactory. The reactor should be equipped with means for agitation. The gas outlet tube should be protected from inflow of outside air by suitable traps.

The copolymers can be prepared by a continuous process at atmospheric, subatmospheric or superatmospheric pressure. Thus, the solvent, the catalyst components, and the monomers may be introduced continuously into a polymerization zone at such a rate as to provide a residence time sufficient to build up the desired concentration of copolymer in the polymerization mass. The residence time may vary widely, for example from five minutes to an hour or more. In general, the residence time will be shorter as the concentrations of monomers and catalysts in the feed stream are increased. Continuous introduction of premixed catalyst is helpful in maintaining a convenient reaction rate and obtaining a suitable output per reactor volume time. The polymerization solution which continually overflows from the polymerization zone is contacted in a subsequent zone with a catalyst deactivator; the copolymer is ultimately obtained after suitable batchwise or continuous acidification and purification and isolation procedures similar to those described.

In operating the polymerization process, care should be taken to exclude all traces of moisture, Zerewitinoff active hydrogen compounds, CO, and oxygen since they can poison the catalyst system. A protective atmosphere of inert gas such as argon or nitrogen is often supplied prior to the introduction of gaseous monomer feed streams. Monomer gases can be purified by passing them successively through columns of silica gel, scrubbers containing triisobutyl aluminum, and a column of silica gel connected to the inlet tube of the reaction vessel. The normally liquid alpha monoolefins can be purified by fractional distillation and passage through silica gel, preferably into the reaction vessel.

The copolymer formed during the reaction generally remains in solution although some may separate as a gel. After it is desired to stop the reaction, the catalyst is deactivated by addition of a lower alkyl alcohol such as isopropyl alcohol. The free carboxylic acid is liberated from the magnesium salt by treating the polymer solution with a solution made by mixing 70 parts of phosphorus pentoxide with 1000 parts of isopropyl alcohol. This procedure is effective in removing the metals from the copolymer product. Alternatively, the copolymer solution in tetrachloroethylene is washed with a mixture of 1 volume of 35% hydrochloric acid and 5 volumes of methanol. Thereafter, the copolymer solution is poured into a non-solvent for the copolymer such as acetone and the copolymer thereby liberated can be finally obtained by drying in a vacuum oven or when elastomeric, on a rubber roll mill. When the copolymer has been treated with dilute mineral acid, it is preferred to wash it acid-free with water prior to precipitation from the reaction solvent.

Representative examples illustrating the present invention follow.

*Preparation of magnesium undecenoate.*—A 1.23-gram portion of magnesium was heated, while stirred, with 20 ml. of methanol until completely dissolved. Then 18.5 grams of undecenoic acid (0.10 mole) were added. After the resulting clear solution had cooled, benzene was added. Partial removal of methanol under vacuum gave a gelatinous mass. A crystalline product was obtained after all traces of solvent had been removed.

*Preparation of zinc undecenoate.*—Eleven grams of zinc acetate dihydrate (0.1 mole), 20 ml. of undecenoic acid (0.2 mole) and 40 ml. of orthodichlorobenzene were stirred together while heated. Distillation under reduced pressure was carried out to remove acetic acid, water and about 7 ml. of orthodichlorobenzene. The product was then recrystallized from about 200 ml. of benzene and filtered. The dry crystals obtained analyzed for 15.7 and 15.9% zinc (theoretical value 15.1).

EXAMPLE 1

The reaction flask was a 500-ml. glass 4-neck flask equipped with a stirrer, a thermometer, and a gas inlet tube, a gas outlet tube, and a liquid inlet tube covered with a rubber (serum) cap. This apparatus was flame dried and allowed to cool under a stream of purified nitrogen which was maintained during subsequent operations until monomer gases were introduced. Two hundred and fifty milliliters of tetrachloroethylene at about 25° C. were filtered through a column of silica gel into the reaction flask and sparged with purified nitrogen for about 30 minutes while rapidly stirred. Then 0.00112 mole of diisobutyl aluminum chloride and 0.00025 mole of vanadium oxytrichloride were introduced into the reactor through the serum cap by means of syringes. The catalyst solution was stirred for four minutes at 25° C. One gram of dry powdered magnesium 10-hendecenoate was then added. After the mixture had been stirred for one additional minute to dissolve part of the salt, the nitrogen feed was stopped and a gas stream supplying ethylene and propylene at respective rates of 9.3 and 37 grams per hour, respectively, was introduced into the agitated mixture by means of the gas inlet tube which projected below the liquid surface. The ethylene and propylene had been separately metered through flowmeters to pass successively through aluminum triisobutyl, and a silica gel column leading to the reactor.

For 20 minutes the reaction mixture was agitated at about 20° C. while monomer gases were introduced. An appreciable amount of polymer product appeared as loose gel. The reaction was then stopped by shutting off the monomer feed streams and adding 10 ml. of isopropyl alcohol. The carboxyl groups were liberated by adding, with stirring, 50 ml. of methanol, 10 ml. of 35% hydrochloric acid, and 10 ml. of water. The reaction mixture was separated and twice more digested with methanolic HCl as above. After a small amount of undigested gel had been removed, the tetrachloroethylene polymer solution was poured slowly into 700 ml. of acetone; 0.94 gram of soft rubbery ethylene/propylene/10-hendecenoic acid copolymer precipitated. The infrared spectrum of this product showed an absorption peak at 8.7 microns corresponding to about 50% propylene monomer units by weight and an absorption peak at 5.8 microns equivalent to that produced by about 0.03 gram-mole of carboxylic acid substituted monomer units/kilogram of copolymer.

A solution of 0.2 gram of this copolymer in 10 ml. of xylene was completely gelled by the addition of two drops (about 0.05 gram) of tetraethylene pentamine and 0.020 gram of aluminum isopropoxide.

EXAMPLE 2

The equipment and general procedure described in Example 1 were used except as noted below.

To the catalyst solution in tetrachloroethylene were added 4.3 grams of zinc 10-hendecenoate. Ethylene was then introduced for one hour at 25° C. at the rate of 9.3 grams per hour. After the catalyst had been destroyed with 5 ml. of isopropyl alcohol, 10 ml. of an acid solution (70 grams of phosphorus pentoxide in a liter of isopropyl alcohol) were introduced. The solution was poured into acetone and the resulting precipitate was filtered, extracted with acetone, and air dried to give 0.5 gram of an ethylene/10-hendecenoic acid copolymer containing an estimated 0.1 gram-mole carboxyl groups per kilogram of copolymer.

EXAMPLE 3

The general equipment and procedure described in Example 1 were used except as noted below. The coordination catalyst was formed by stirring 0.265 gram of vanadium tris(acetylacetonate) (0.001 molar) and 8 millimoles of diisobutyl aluminum chloride (1.5 molar solution of tetrachloroethylene) into 750 ml. of methylene chloride for four minutes at 0° C. After 2.16 grams of powdered zinc 10-hendecenoate had been added, the nitrogen stream was turned off and the monomer gas feed was introduced supplying ethylene and propylene for five minutes at respective rates of 9.3 and 37 grams per hour; thereafter for 65 minutes the rates were, respectively, 14.7 and 37 grams per hour. The monomer feed stream was shut off and 10 ml. of methanol and 10 ml. of the isopropyl alcohol-phosphoric acid mixture described in Example 2 above were introduced, in turn, to deactivate the catalyst and free the carboxyl groups. After the mixture had been stirred for one hour, 1.1 grams of polymer were collected and dried. This product was purified by dissolving it in 20 milliliters of xylene and warming it after stirring in 2 ml. of isopropyl alcohol-phosphoric acid solution. This mixture was then extracted, in turn, with 10 ml. of 35% hydrochloric acid and 10 ml. of water and then coagulated by pouring into acetone. The salt-free ethylene/propylene/10-hendecenoic acid copolymer obtained analyzed for 55 weight percent propylene monomer units, 42 percent ethylene monomer units and 0.5 gram-mole of carboxyl group per kilogram of copolymer.

EXAMPLE 4

The procedure of Example 1 above was repeated except as noted below. The catalyst solution, 0.0019 molar in vanadium and 0.02 molar in aluminum, was prepared at 25° C. by stirring vanadium tris(acetylacetonate) and diisobutyl aluminum chloride into 750 ml. of tetrachloroethylene. After 1 gram of zinc 10-hendecenoate had been introduced, a monomer gas stream was turned on supplying ethylene and propylene for five minutes at respective rates of 7.6 and 44 grams/hour and thereafter for 55 minutes at respective rates of 14.3 and 44 grams/hour; the temperature was always maintained at 25° C. After the catalyst had been deactivated by addition of 10 ml. of isopropyl alcohol, the polymer product was digested with 50 ml. of isopropyl alcohol/phosphoric acid mixture described in Example 2 above, and stirred finally with a mixture of 20 ml. of 35% hydrochloric acid in 50 ml. of water. The mixture was filtered, the layers were separated, and the tetrachloroethylene solution—after being concentrated to 250 ml. volume—was poured into 750 ml. of acetone to precipitate the polymer. About 6.8 grams of a soft ethylene/propylene/10-hendecenoic acid copolymer were obtained having an inherent viscosity of 0.73 and analyzing for 51% propylene monomer units, and 0.10 gram-mole of carboxyl groups per kilogram of copolymer. This corresponds to about 0.2 carboxyl group for every one hundred chain carbon atoms.

EXAMPLE 5

The procedure of Example 1 above was repeated except as noted below. A bright orange catalyst solution was made at 0° C. by introducing 0.10 gram of vanadium tris(acetylacetonate) and 1.5 ml. diisobutyl aluminum chloride solution (1.5 molar in tetrachloroethylene) into 250 ml. of carbon tetrachloride. To this solution was then added 0.5 gram of zinc 10-hendecenoate. A monomer gas mixture was introduced supplying ethylene and propylene at respective rates of 9.3 and 37 grams per hour for six minutes and then 9.2 and 32 grams per hour for 14 minutes at 0° C. Then 1.8 grams of ethylene/propylene/10-hendecenoic acid copolymer were isolated by deactivating the catalyst, washing with the alcoholic phosphoric acid, and evaporating the carbon tetrachloride solution to dryness. The elastomer analyzed for 33% propylene monomer units by weight, and 0.014 gram-mole of carboxyl units per kilogram of copolymer (corresponding to about 0.022 carboxyl group per hundred chain carbon atoms).

EXAMPLE 6

The procedure of Example 1 above was repeated except as noted below. A 2-liter reaction flask was employed. An agitated solution of 4 grams of zinc 10-hendecenoate in 1400 ml. of tetrachloroethylene was treated for 15 minutes by introducing ethylene and propylene at respective rates of 9.3 and 37 grams per hour. A catalyst mixture, separately made by stirring together 1.40 grams (0.004 mole) of vanadium tris(acetylacetonate), 20 ml. of diisobutyl aluminum chloride solution (0.030 mole) and 100 ml. of tetrachloroethylene at 25° C. was added to the agitated reactor over a 50-minute period while the temperature was maintained at about 25° C. After eight minutes of this period, the ethylene rate was changed to 14.3 grams per hour. At the end of this period the catalyst was deactivated with 20 ml. of isopropyl alcohol and 50 ml. of the mixture of isopropyl alcohol and phosphorus pentoxide described in Example 2. After the mixture had been warmed to dissolve the digested polymer product, the solution obtained was extracted with 300 ml. of 9% hydrochloric acid. The volume was then concentrated to about 500 ml. of 18 grams of a slightly tacky elastomer were obtained by pouring the mixture into 1200 ml. of acetone. This ethylene/propylene/10-undecenoic acid copolymer exhibited an inherent viscosity of 1.35 (0.1% by weight solution in tetrachloroethylene at 30° C.) and analyzed for 60% propylene units by weight and 0.04 gram-mole per kilogram copolymer of carboxyl groups corresponding to 0.7% undecenoic acid monomer units by weight. This corresponds to about 0.06 carboxyl group per 100 chain carbon atoms in the polymer.

The modification of the polymethylene polymers in accordance with the present invention permits variation in the extrusion behavior of copolymers by modifying the plasticity. The carboxy-containing polymethylene compound had a Wallace plasticity of 19 (100° C.). After 100 parts of this polymer had been compounded on a rubber roll mill at 40° C. with 2.5 parts of aluminum isopropoxide, the resulting elastomer exhibited a Wallace plasticity of 25.

EXAMPLE 7

(A) Ozonolysis equipment

The ozone was generated by a Model T-23 laboratory Ozonator supplied by the Ozone Process Division, the Wellsbach Corporation, 2409 Westmoreland, Philadelphia 29, Pa. This apparatus will produce at least 2 grams of ozone an hour at a 1% (by weight) concentration in clean, dry air (−60° F. dewpoint), when operated with 115-volt, 60-cycle current. The ozone concentration is varied by changing the voltage or by changing the flow of air through the apparatus. The ozone concentration present in the stream is determined by taking off a small measured amount of ozonized gas and absorbing the ozone in neutral potassium iodide solution.

(B) Ozonolysis of ethylene/1-butene/1,4-hexadiene copolymer

The ethylene/1-butene/1,4-hexadiene copolymer was made in accordance with the general directions given in U.S. Patent 2,933,480 using tetrachloroethylene solvent at 25° C. and a coordination catalyst made by mixing vanadium oxytrichloride and diisobutyl aluminum chloride (molar ratio Al:V=3.8). The copolymer contained 58.8 weight percent ethylene monomer units, 37% 1-butene monomer units, and 4.2% 1,4-hexadiene monomer units. It exhibited an inherent viscosity (0.1% by weight solution in tetrachloroethylene at 30° C.) of 1.52.

Twenty grams of the above copolymer were stirred into 400 ml. of carbon tetrachloride at 25° C., the resulting viscous solution being filtered through cheese cloth to remove about 4 grams of insoluble material.

A 13% solution of peracetic acid was prepared by mixing together at 25° C. 9 ml. of glacial acetic acid, 1 ml. of acetic anhydride, and 5 ml. of 40% peracetic acid.

A solution of 2 ml. of acetic acid and 30 ml. of methyl alcohol in 200 ml. of carbon tetrachloride at 25° C. was treated for about 20 minutes with a stream of ozone, supplied at the rate of about 1.3 grams (0.028 gram-mole) per hour. Thereafter, while ozone inflow continued unchanged, 100 ml. of the copolymer solution described above were added to this ozonized solution over a 25-minute period. Then ozone inflow was stopped and 5 ml. of 15% peracetic acid solution were introduced, the resulting mixture then being heated at reflux (about 80° C./750 mm.) for a period of about 1 hour. Thereafter the mixture was cooled to room temperature (25° C.) and extracted with an equal volume of water to remove alcohol and acid and low molecular weight by-products such as acetic acid. The copolymer was isolated by coagulation with acetone.

The copolymer obtained analyzed for 1.77% oxygen (equivalent to 0.55 gram-mole COOH/kg.) and was found by titration to contain 0.4 gram-mole/kg. of acidic function. The potassium salt prepared by neutralization showed strong infrared absorption at 6.3 microns and little remaining absorption at 5.7–5.8 microns. (The starting copolymer contained 0.51 gram-mole unsaturation per kilogram.) This product corresponds to about 0.8–1.2 carboxyl groups/100 chain-carbon atoms.

EXAMPLE 8

*Ozonolysis of ethylene/propylene/1,4-hexadiene copolymer*

Seventy-five grams of copolymer containing 41 weight percent propylene monomer units and 4.5% 1,4-hexadiene monomer units (a 0.1% by weight solution in tetrachloroethylene having an inherent viscosity of 2.12) was dissolved in one gallon of carbon tetrachloride at 25° C. by stirring overnight. To this solution were added 100 ml. methanol, 20 ml. acetic acid and 100 ml. additional carbon tetrachloride. Ozone was then passed into the solution as described above for two hours at 0.07 cu.ft./min. and one-half hour at 0.035 cu. ft./min. Ten ml. of 40% peracetic acid were added and the solution heated to reflux for four hours. The solution was washed by stirring it with one liter of water, separated, heated briefly to reflux with 500 ml. of water containing 10 ml. acetic acid, and let stand 72 hours. The resulting carbon tetrachloride layer was evaporated at room temperature after the addition of 0.75 gram N-phenyl-beta-naphthylamine antioxidant and passed through a hot rubber mill to complete removal of solvents. This resulting product was estimated to contain 0.5 gram-mole/kilogram carboxyl by oxygen analysis, 0.7 gram-mole/kilogram by titration. Five grams of this copolymer were compounded on a rubber mill at 100° C. with two grams ("Philback O") high abrasion furnace black, three grams "Primol D" petroleum oil, 0.3 gram zinc stearate and 0.06 gram magnesium oxide, and pressed into a slab at 140° C. The resulting material had all the appearance of a cured elastomer exhibiting a tensile strength of 400 p.s.i. and an extension at break of 360% at 25° C. with no permanent set. The material was then remolded into a Yerzley resilience pellet and the resilience was found to be 68% at 25°, Shore A hardness 32. This thermoplastic elastomer behaves like a cured rubber at room temperature but can be repeatedly reshaped at elevated temperatures.

EXAMPLE 9

*Ozonolysis of propylene/1-butene/11-ethyl-1,11-tridecadiene copolymer*

The copolymer which was ozonized was made by copolymerizing propylene, 1-butene, and 11-ethyl-1,11-tridecadiene. It contained about 75% by weight propylene monomer units and about 0.4 gram-mole/kilogram of diene monomer units. It exhibited an intrinsic viscosity in benzene of 4.45 and an iodine number of 10. A solution was prepared by agitating 5 grams of this copolymer with 250 ml. of refluxing carbon tetrachloride for 3 hours at atmospheric pressure.

To the agitated solution containing 5 ml. of acetic acid and 0.5 ml. of water, ozone was supplied for 30 minutes at the rate of 0.035 cu. ft./min. Finally the ozone inflow was stopped and the resulting mixture was allowed to stand for about 1 hour. Then 2 ml. of peracetic acid were introduced and the mixture was refluxed (about 80° C.) at atmospheric pressure for 2 hours. After being cooled to room temperature, the solution was extracted with 100 ml. of water, the solvent then being removed by pan drying. The copolymer obtained had 0.6 gram-mole carboxyl groups per kilogram corresponding to about 0.8–1.2 carboxyl groups/100 chain carbon atoms.

EXAMPLE 10

The ozonolysis equipment described in Part A of Example 7 was employed.

*Ozonolysis of ethylene/1,4-hexadiene copolymer*

An ethylene/1,4-hexadiene copolymer was employed which exhibited an iodine number of 89 corresponding to 3.5 gram-mole of carbon-carbon double bonds per kilogram. A solution was made by adding 13.0 grams of this copolymer in 250 ml. of carbon tetrachloride and filtering off 0.4 gram of insoluble material.

Ozone at the rate of 0.07 cu. ft./min. was introduced for 120 minutes into a solution of 5 ml. of acetic acid, 5 ml. of methyl alcohol, and 150 ml. of carbon tetrachloride at 25° C. while the above-described copolymer solution was added. Ozone flow was continued for an additional 30 minutes at 0.035 cu. ft./min. Then 50 ml. of water were added and the mixture was stirred for one hour. To the orange jelly-like emulsion which resulted was added 5 ml. of peracetic acid. The resulting mixture was refluxed for three hours on a steam bath. Then 200 ml. of water were added and the carbon tetrachloride was removed as a water/carbon tetrachloride azeotrope. The remaining water was decanted off and fresh distilled water was introduced. After the mixture had been heated to boiling, a major portion of the water was decanted off and the remaining water was removed under reduced pressure. The copolymer was allowed to air dry. The copolymer obtained had 2.8 gram-mole carboxyl groups per kilogram, corresponding to about 5 carboxyl groups/100 chain carbon atoms.

The ethylene/propylene/1.4-hexadiene copolymer of Example 8 was made in accordance with the general directions of U.S. Patent 2,933,480 using tetrachloroethylene solvent at 40° C. and a coordination catalyst made by mixing vanadium oxytrichloride and diisobutyl aluminum chloride (molar ratio Al:V=2:1).

The propylene/1-butene/11-ethyl-1,11-tridecadiene copolymer of Example 9 was made in accordance with the general directions of U.S. Patent 2,933,480 at about 5–15° C. In turn, 0.025 g.-mole of n-butyl lithium, 0.025 g.-mole of tri-isobutyl aluminum, 0.0125 g.-mole of titanium tetrachloride, and 0.175 g.-mole of 11-ethyl-1,11-tridecadiene were introduced into an agitated mixture consisting of 1.5 g.-moles of 1-butene, 1.5 g.-moles of propylene, and 2000 milliliters of tetrachloroethylene. The reaction time was 45 minutes.

The ethylene/1,4-hexadiene copolymer of Example 10 was made in accordance with the general directions of U.S. Patent 2,933,480 using carbon tetrachloride solvent at 0° C. A gas feed mixture supplying ethylene at the rate of 1.5 liters/min. and nitrogen at the rate of 1.0 liter/min. was passed into an agitated 1 molar solution of 1,4-hexadiene in carbon tetrachloride in the presence of a coordination catalyst made by mixing diisobutylaluminum chloride and vanadium tris(acetylacetonate); A1:V molar ratio, 7.5:1; V concentration in the reactor, 0.005 molar.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A normally solid chain-saturated ethylene copolymer consisting of units of ethylene ($-CH_2-CH_2-$), propylene

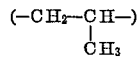

and monomer units of the formula

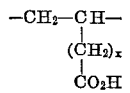

wherein x is an integer of from 1 to 8, said copolymer containing (A) from 0.5 to 20 —$CO_2H$ side-chains per 100 chain carbon atoms and (B) from 0 to 49.5 —$CH_3$ side-chains per 100 chain carbon atoms, the maximum value of A and B equal to 50.

2. A copolymer as described in claim 1 wherein said carboxylic acid is 10-hendecanoic acid.

3. A copolymer as described in claim 1 wherein said carboxylic acid is vinyl acetic acid.

4. A process for preparing normally solid chain-saturated, side-chain carboxyl-substituted polymethylene polymers, which process comprises (I) contacting a copolymer of (a) at least one straight-chain α-monoolefin of from 2 to 8 carbon atoms and (b) at least one non-conjugated $C_5-C_{22}$ hydrocarbon diene of an aliphatic open-chain structure, with ozone while in an ozone-resistant solvent solution, and (II) contacting the resulting solution with an organic, active oxygen-containing per-acid.

5. A process for preparing normally solid, chain-saturated, side-chain carboxyl-substituted polymethylene polymers, which process comprises (I) contacting a copolymer of ethylene, propylene, and a non-conjugated $C_5-C_{22}$ hydrocarbon diene of an aliphatic open-chain structure with 3 to 4 moles of ozone, per mole of carbon-carbon double bond in said copolymer, while in an ozone-resistant solvent solution containing 5 to 10 moles of an agent selected from the group consisting of methanol and acetic acid per mole carbon-carbon double bond in said copolymer, and (II) contacting the resulting solution with an organic per-acid containing 2 to 3 gram-atoms of active oxygen per mole of carbon-carbon double bond initially present in said polymer.

6. A process which comprises (I) copolymerizing at least one straight-chain α-monoolefin of from 2 to 8 carbon atoms and a monomer of the formula $$CH_2=CH-(CH_2)_n-CO_2M$$

wherein n is from 1 to 16 and M is magnesium or zinc, in an inert solvent and in the presence of an organo aluminum-vanadium salt coordination catalyst system at a temperature of from about 0° to 25° C., and (II) acidifying the resulting polymer with an amount of acid more than equivalent to the number of —$CO_2M$ groups; said monomer being present in an amount such that the copolymer prepared in step (I) will have less than about 0.35 —$CO_2M$ groups per 100 chain carbon atoms.

7. A process as defined in claim 6 wherein said α-monoolefin is ethylene.

8. A process as defined in claim 6 wherein the α-monoolefins are ethylene and propylene and n is 8.

References Cited by the Examiner

UNITED STATES PATENTS

| | | | |
|---|---|---|---|
| 2,200,429 | 5/1940 | Perrin et al. | 260—88.1 |
| 2,920,067 | 1/1960 | Mortimer | 260—88.1 |
| 2,933,480 | 4/1960 | Gresham et al. | 260—80.5 |
| 3,005,807 | 10/1961 | Schultze et al. | 260—96 |

OTHER REFERENCES

"The Vanderbilt Rubber Handbook," pages 228–36, R. T. Vanderbilt Co., New York, 1958. (Copy in Scientific Library, TS1890V3).

Lowman et al.: Proceedings International Rubber Conference, November 1959. (Copy in Scientific Library, TS1811 I5).

Cooper et al.: Journal of Polymer Science 44, 397–409 (1960).

Kirk-Othmer: Encyclopedia of Chemical Technology, No. 9, pages 735–140. (Ref. TP9E68).

JOSEPH L. SCHOFER, *Primary Examiner.*

L. J. BERCOVITZ, *Examiner.*

UNITED STATES PATENT OFFICE
CERTIFICATE OF CORRECTION

Patent No. 3,250,754                                  May 10, 1966

Clare Augustus Stewart, Jr.

It is hereby certified that error appears in the above numbered patent requiring correction and that the said Letters Patent should read as corrected below.

Column 2, lines 41 to 44, the right-hand portion of the formula should appear as shown below instead of as in the patent:

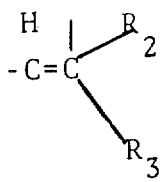

column 6, line 29, for "1,-dichloroethane" read -- 1,2-dichloroethane --; line 54, for "produces" read -- procedures --; line 57, for "5° C." read -- 25° C. --; column 13, line 43, for "10-hendecanoic" read -- 10-hendecenoic --; column 14, line 51, for "140" read -- 740 --.

Signed and sealed this 22nd day of August 1967

(SEAL)
Attest:

ERNEST W. SWIDER                       EDWARD J. BRENNER
Attesting Officer                 Commissioner of Patents